US011659434B2

(12) United States Patent
Shi et al.

(10) Patent No.: US 11,659,434 B2
(45) Date of Patent: *May 23, 2023

(54) TRANSPORT PROTOCOL FOR LATENCY SENSITIVE APPLICATIONS

(71) Applicant: AT&T Intellectual Property I, L.P., Atlanta, GA (US)

(72) Inventors: Shu Shi, Summit, NJ (US); Rittwik Jana, Montville, NJ (US); Bo Han, Bridgewater, NJ (US); Bo Chen, Champaign, IL (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/647,399

(22) Filed: Jan. 7, 2022

(65) Prior Publication Data

US 2022/0132363 A1  Apr. 28, 2022

Related U.S. Application Data

(63) Continuation of application No. 16/795,033, filed on Feb. 19, 2020, now Pat. No. 11,252,600.

(51) Int. Cl.
*H04W 28/02* (2009.01)
*H04L 47/193* (2022.01)
(Continued)

(52) U.S. Cl.
CPC ....... *H04W 28/0273* (2013.01); *A63F 13/355* (2014.09); *H04L 43/087* (2013.01);
(Continued)

(58) Field of Classification Search
None
See application file for complete search history.

(56) References Cited

U.S. PATENT DOCUMENTS

| 2003/0177187 A1* | 9/2003 | Levine | H04L 67/52 709/205 |
| 2008/0082142 A1* | 4/2008 | Clark | H04L 69/40 607/60 |
| 2012/0188928 A1* | 7/2012 | Wang | H04L 67/145 370/311 |

OTHER PUBLICATIONS

Iyengar et al., "Draft-ietf-quic-transport-19—QUIC: A UDP-Based Multiplexed and Secure Transport," https://tools.etf.org/html/draft-ietf-quic-transport-19, Mar. 2019, 140 pages.
(Continued)

*Primary Examiner* — Kevin T Bates
*Assistant Examiner* — Emad Siddiqi
(74) *Attorney, Agent, or Firm* — Amin, Turocy & Watson, LLP

(57) ABSTRACT

The described technology is generally directed towards a transport protocol for latency sensitive applications. The disclosed transport protocol is "semi-reliable" in that it allows for specification of an importance of data being transmitted, thereby allowing important data to be sent reliably, while other data can be dropped if necessary, e.g., under bad network conditions. A deadline can be specified for such other data, and if the other data cannot be sent prior to the deadline, it can be dropped. Furthermore, the disclosed transport protocol can allow for early discovery of network jitter. A client device can send regular acknowledgments which identify most recently received data packets as well as a number of "heartbeat transmissions" received at the client device. A server device can use the acknowledgments to discover and respond to jitter.

20 Claims, 14 Drawing Sheets

(51) Int. Cl.
*H04L 47/2475* (2022.01)
*H04L 43/087* (2022.01)
*H04L 43/10* (2022.01)
*A63F 13/355* (2014.01)
*H04L 47/283* (2022.01)
*H04L 67/01* (2022.01)

(52) U.S. Cl.
CPC ............ *H04L 43/10* (2013.01); *H04L 47/193* (2013.01); *H04L 47/2475* (2013.01); *H04L 47/283* (2013.01); *H04L 67/01* (2022.05)

(56) References Cited

OTHER PUBLICATIONS

Jacobson et al., "Congestion Avoidance and Control," ACM SIGCOMM Computer Communication Review, Nov. 1988, 25 pages.
Non-Final Office Action received for U.S. Appl. No. 16/795,033 dated Jan. 7, 2021, 24 pages.
Final Office Action received for U.S. Appl. No. 16/795,033 dated Jul. 9, 2021, 29 pages.

\* cited by examiner

TRANSPORT PROTOCOL FOR LATENCY SENSITIVE APPLICATIONS

RELATED APPLICATION

The subject patent application is a continuation of, and claims priority to, U.S. patent application Ser. No. 16/795,033 (now U.S. Pat. No. 11,252,600), filed Feb. 19, 2020, and entitled "TRANSPORT PROTOCOL FOR LATENCY SENSITIVE APPLICATIONS," the entirety of which application is hereby incorporated by reference herein

TECHNICAL FIELD

The subject application is related to wireless communication systems in general, and to fifth generation (5G) and subsequent generation cellular communication systems in particular.

BACKGROUND

Cloud gaming has been gaining popularity. In a typical cloud gaming scenario, a client device connects to a remote server device that hosts a cloud gaming application. The client device receives video game inputs from a user, and the client device transmits the inputs to the server device. The server device can be referred to as a "cloud" server. The cloud gaming application at the server device conducts video rendering in the cloud, and the server device streams video frames to the client device.

One strength of cloud gaming is that the client device does not need powerful hardware to play video games. However, the client device does need to have good access to a communication network. The video frames generated by the cloud server should arrive at the client device at a nearly constant rate, e.g., 30 frames per second (fps) or 60 fps, for the client device to not experience any lag or video freeze. If a video frame is delayed and does not arrive before the time it should, e.g., 33 milliseconds (ms) after the arrival of a previous frame, the delayed video frame can become useless to the client device and the client device may try to skip to later received video frames in order to provide the best possible user experience under suboptimal conditions.

State of the art wired and Wi-Fi networks can often deliver video frames fast enough to provide good cloud gaming experiences. However, cellular communications networks, such as modern Long Term Evolution (LTE) networks, often experience delays caused by network jitter. As a result, users are likely to have bad cloud gaming experiences when attempting cloud gaming via today's cellular communications networks. While the emergence of 5G cellular communication systems should improve cloud gaming experiences, 5G will also lead to increased user attempts at cloud gaming over cellular communications networks, which accordingly increases the importance of cellular communications networks' ability to provide high quality cloud gaming experiences.

Although there are network transport protocols, such as QUIC and TCP, that work under various network conditions, existing network transport protocols are not particularly effective for cloud gaming. One reason for this is that existing network transport protocols are not designed to address cellular communication network jitter. Existing network transport protocols can use congestion control to deal with packet losses caused by network congestion, however, jitter often do not cause packet losses. Existing network transport protocols typically become aware of jitter by receiving a late acknowledgement or reaching a timeout, which is often too late to mitigate jitter.

Furthermore, existing network transport protocols are not designed with the understanding that that delayed packets can become useless to the client device. As a result, existing network transport protocols continue to re-send useless packets when there is jitter in the network. Such needless re-sending of useless packets wastes network bandwidth on transmitting useless data, and also wastes client device processing time involved receiving and decoding useless packets.

In view of the foregoing, there is a need in the industry for a network transport protocol that will improve cloud gaming and other latency sensitive streaming video applications, especially over cellular communications networks.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
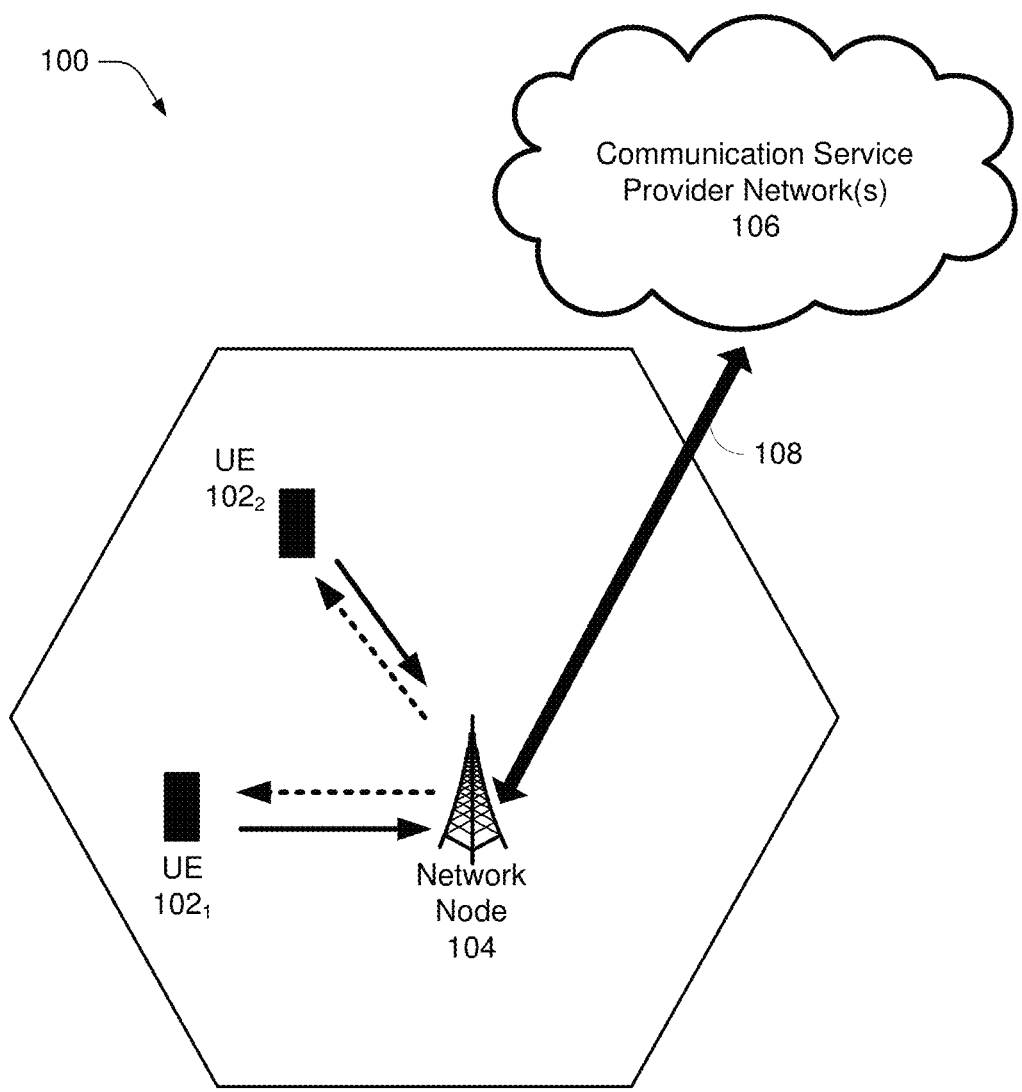
FIG. 1 illustrates an example wireless communication system, in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details, and without applying to any particular networked environment or standard.

One or more aspects of the technology described herein are generally directed towards a transport protocol for latency sensitive applications. The disclosed transport protocol is "semi-reliable" in that it allows specification of an importance of data being transmitted, thereby allowing important data to be sent reliably, while other data with reduced reliability requirements can be dropped, if necessary, e.g., under bad network conditions. A deadline can be specified for the reduced reliability data, and if reduced reliability data cannot be sent prior to the deadline, it can be dropped. Furthermore, the disclosed transport protocol can allow for early discovery of network jitter. A client device can send regular acknowledgments which identify most recently received data packets as well as a number of "heartbeat transmissions" received at the client device. A server device can use the acknowledgments to detect and respond to jitter.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), fifth generation core (5G Core), fifth generation option 3x (5G Option 3x), high speed packet access (HSPA), Z-Wave, Zigbee and other 802.XX wireless technologies and/or legacy telecommunication technologies.

FIG. 1 illustrates a non-limiting example of a wireless communication system 100 in accordance with various aspects and embodiments of the subject disclosure. In one or more embodiments, system 100 can comprise one or more user equipment UEs $102_1$, $102_2$, referred to collectively as UEs 102, a network node 104, and communication service provider network(s) 106.

The non-limiting term "user equipment" can refer to any type of device that can communicate with a network node 104 in a cellular or mobile communication system 100. UEs 102 can have one or more antenna panels having vertical and horizontal elements. Examples of UEs 102 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, and the like. UEs 102 can also comprise IOT devices that communicate wirelessly.

In various embodiments, system 100 comprises communication service provider network(s) 106 serviced by one or more wireless communication network providers. Communication service provider network(s) 106 can include a "core network". In example embodiments, UEs 102 can be communicatively coupled to the communication service provider network(s) 106 via network node 104. The network node 104 (e.g., network node device) can communicate with UEs 102, thus providing connectivity between the UEs 102 and the wider cellular network. The UEs 102 can send transmission type recommendation data to the network node 104. The transmission type recommendation data can comprise a recommendation to transmit data via a closed loop MIMO mode and/or a rank-1 precoder mode.

A network node 104 can have a cabinet and other protected enclosures, computing devices, an antenna mast, and multiple antennas for performing various transmission operations (e.g., MIMO operations). Network node 104 can comprise one or more base station devices which implement features of the network node 104. Network nodes can serve several cells, also called sectors, depending on the configuration and type of antenna. In example embodiments, UEs 102 can send and/or receive communication data via a wireless link to the network node 104. The dashed arrow lines from the network node 104 to the UEs 102 represent downlink (DL) communications and the solid arrow lines from the UEs 102 to the network node 104 represents an uplink (UL) communications.

Communication service provider networks 106 can facilitate providing wireless communication services to UEs 102 via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, millimeter wave networks and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.).

The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation). In an embodiment, network node 104 can be part of an integrated access and backhaul network. This may allow easier deployment of a dense network of self-backhauled 5G cells in a more integrated manner by building upon many of the control and data channels/procedures defined for providing access to UEs.

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g., LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD), LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are planned for use in 5G systems.

Figure 2:
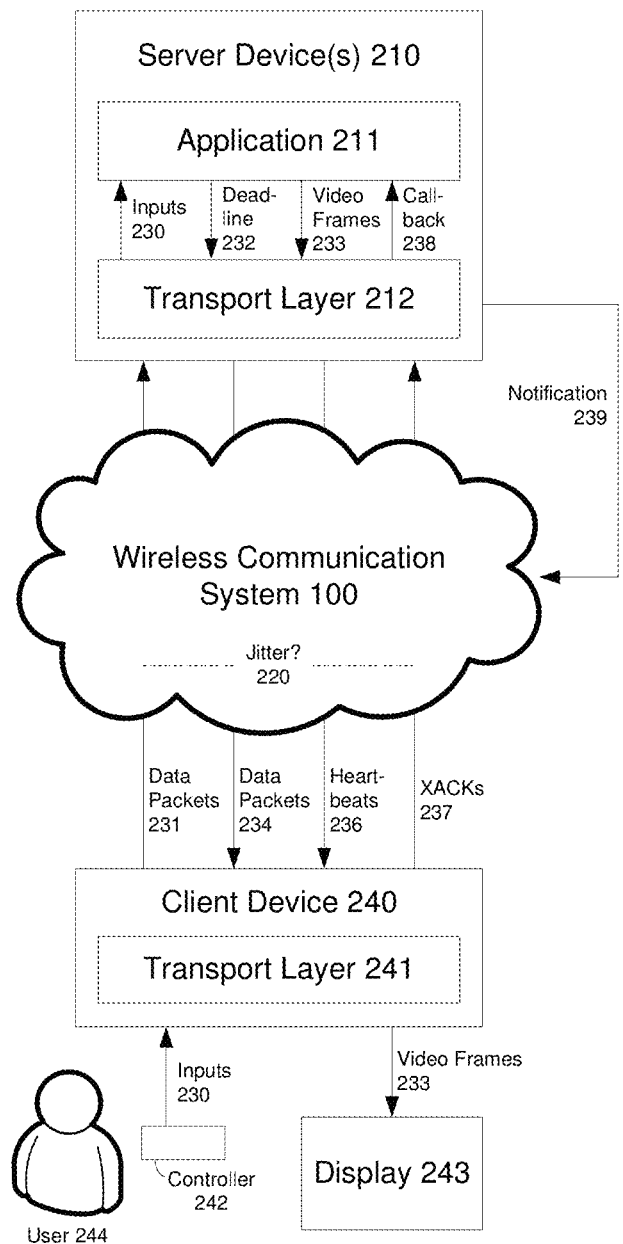
FIG. 2 illustrates an example communications between a client device and a server device, in accordance with various aspects and embodiments of the subject disclosure.

FIG. 2 illustrates an example communications between a client device and a server device, in accordance with various aspects and embodiments of the subject disclosure. FIG. 2 includes server device(s) 210, wireless communication system 100, and client device 240. In an example embodiment, the server device(s) 210 and the client device 240 can send and receive the illustrated communications via the wireless communication system 100 described in detail with reference to FIG. 1. In another example embodiment, the client device 240 can comprise or be communicatively coupled with a UE 102, and the server device(s) 210 can comprise or be communicatively coupled with devices in the communication service provider network(s) 106, illustrated in FIG. 1.

FIG. 2 and the various other figures provided herein describe the disclosed transport protocol in the context of cloud gaming, with the understanding that the transport protocol can be used for any data communications. The disclosed transport protocol is particularly useful for cloud gaming and other latency sensitive applications, however it is not limited to such applications. Server device(s) 210 can comprise an application 210 and a transport layer 212. The application 210 can comprise, e.g., a cloud video gaming application or other latency sensitive application. The transport layer 212 can implement a transport protocol according to this disclosure, in order to send video game data to the client device 240.

The client device 240 can comprise a transport layer 241. The transport layer 241 can implement a transport protocol according to this disclosure, in order to receive video game data from the server device(s) 210. The transport layer 241 can furthermore be configured to acknowledge the receipt of the video game data, as described herein. The client device 240 can also receive inputs 230 from a controller 242 operated by a user 244, and the client device 240 can send the inputs 230 to the server device(s) 210. It will be appreciated by those of skill in the art that server device(s) 210 and client device 240 can comprise numerous other elements and features which are not shown in FIG. 2 for simplicity of description.

In an example use case, the user 244 operates controller 242 to generate inputs 230. The client device 240 converts the inputs 230 into data packets 231, and sends the data packets 231, via wireless communication system 100, to server device(s) 210. The transport layer 212 at server device(s) 210 can unpack data packets 231 and deliver the inputs 230 to the application 211. The transport protocol disclosed herein is described in the context of data packets 234 sent from server device(s) 210 to client device 240, however, it can also optionally be deployed in connection with communications in the opposite direction, namely, for data packets 231 sent from the client 240 to the server device(s) 210.

Application 211 generates video data, e.g., video frames 233, which are responsive to inputs 230. Application 211 can optionally flag some of the video frames 233 having a higher reliability requirement (referred to herein as high reliability video frames) while others of the video frames 233 can have a reduced reliability requirement (referred to herein as reduced reliability video frames). Application 211 can optionally specify a deadline 232 after which the reduced reliability video frames of video frames 233 can be discarded if not received by client device 240. Application 211 can provide the deadline 232 and the video frames 233 to the transport layer 212. In another embodiment, a default deadline 232 can be used by transport layer 212 and the deadline 232 need not be specified by the application 211.

Transport layer 212 can generate and send data packets 234 comprising video frames 233 to the client device 240 via wireless communication system 100. Transport layer 212 can also send heartbeats 236 to the client device 240. As illustrated in FIG. 2, jitter 220 may or may not exist in the wireless communication system 100. The heartbeats 236 can be used to detect jitter 220, as will be described herein.

Transport layer 241 at client device 240 can receive data packets 234 and heartbeats 236. The client device 240 can unpack the data packets 234, sequence and send the video frames 233 to the display 243. The user 244 views video comprising video frames 233 on the display 243, and the user 244 can respond by operating controller 242 to generate further inputs 230. Transport layer 241 can also generate and send acknowledgements, referred to herein as XACKs 237, to the server device(s) 210. Further aspects of the XACKs 237 are described herein in connection with subsequent figures.

Transport layer 212 at server device(s) 210 can use the XACKs 237 in a variety of ways. For example, transport layer 212 can identify whether any video frames 233 have not arrived at client device 240 as expected. Transport layer 212 can re-send reduced reliability video frames of video frames 233, if the deadline 232 for such frames is not yet expired. Otherwise, if the deadline 232 is passed or expired, transport layer 212 can discontinue attempts to resend the reduced reliability video frames of video frames 233. For high reliability video frames of video frames 233, transport layer 212 can continue to re-send the high reliability video frames regardless of the deadline 232 for reduced reliability video frames.

In an embodiment, transport layer 212 can perform a callback 238 to application 211 to inform the application 211 of any video frames 233 which were delayed or not successfully delivered to client device 240. In another aspect, transport layer 212 can send a notification 239 to wireless communication system 100, the notification 239 comprising information about a detected jitter 220 and/or network settings or other instructions for wireless communication system 100 to mitigate the detected jitter 220.

Figure 3:
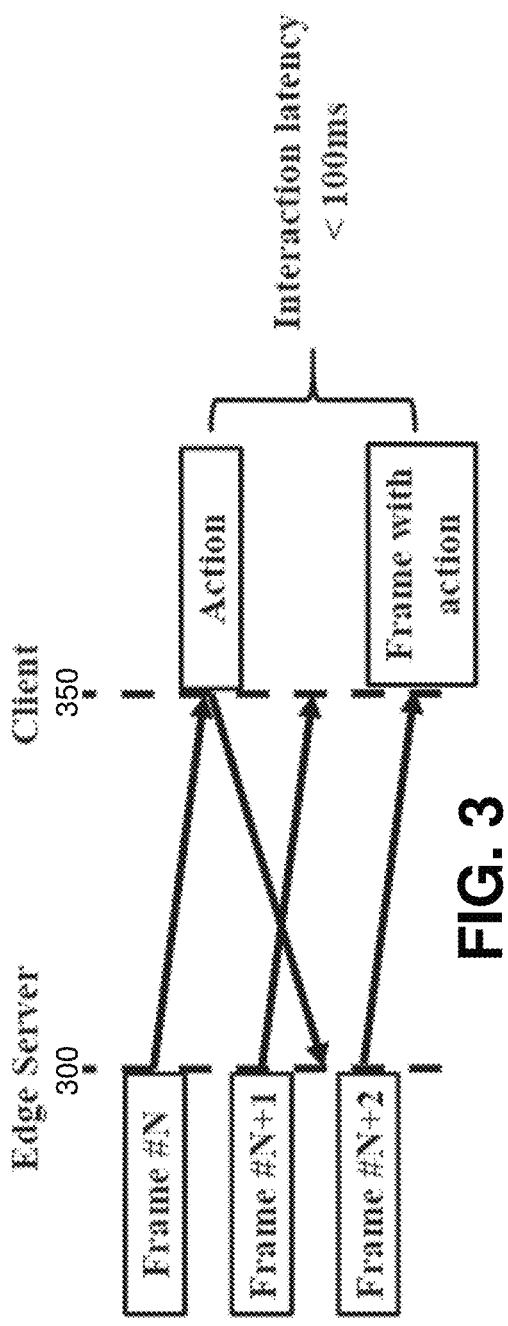
FIG. 3 illustrates example cloud gaming interactions between an edge server and a client, in accordance with various aspects and embodiments of the subject disclosure.

FIG. 3 illustrates example cloud gaming interactions between an edge server and a client, in accordance with various aspects and embodiments of the subject disclosure. In FIG. 3, the edge server 300 can comprise, e.g., a server device of server device(s) 210 illustrated in FIG. 2, and the client 350 can comprise, e.g., the client device 240 illustrated in FIG. 2. FIG. 3 illustrates the edge server 300 sending video frames comprising Frame N, Frame N+1, and Frame N+2 to the client 350, and the client 350 receiving Frame N, Frame N+1, and Frame N+2, and sending action inputs to the edge server 300.

There is a certain amount of latency inherent in the interactions between the edge server 300 and the client 350, as shown in FIG. 3. The client 350 receives Frame N, and generates a responsive action, e.g., an input 230 as illustrated in FIG. 2. The responsive action is sent to the edge server 300. However, by the time the client action arrives at the edge server 300, the edge server 300 has already generated and sent Frame N+1. The edge server 300 next receives the client action, and the edge server 300 responds to the action when generating Frame N+2. By the time Frame N+2 arrives at the client 350, Frame N+1 has already arrived at the client 350. Such interaction latency degrades user experience and should be minimized. However, latency that is under 100 milliseconds as measured at the client 350, as illustrated in FIG. 3, is generally considered acceptable to provide a high quality user experience which is not perceptibly affected by the latency.

Figure 4:
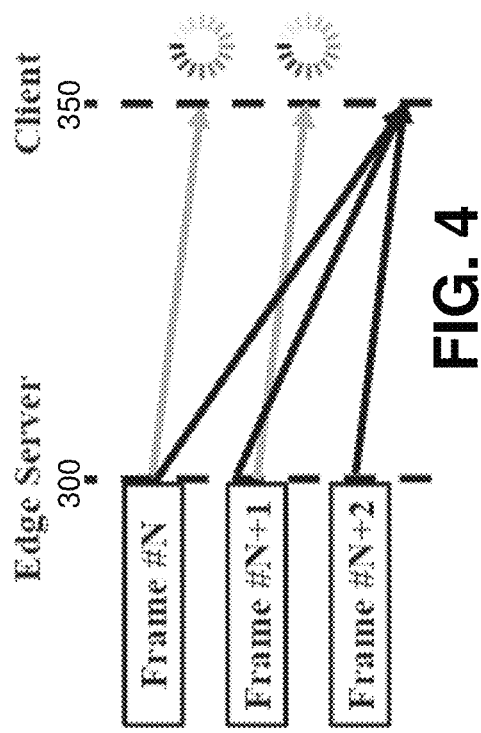
FIG. 4 illustrates example cloud gaming interactions affected by jitter, in accordance with various aspects and embodiments of the subject disclosure.

FIG. 4 illustrates example cloud gaming interactions affected by jitter, in accordance with various aspects and embodiments of the subject disclosure. FIG. 4 includes the edge server 300 and the client 350 introduced in FIG. 3. However, in the presence of jitter, e.g., jitter 220 illustrated in FIG. 2, the Frame N and Frame N+1 are delayed and arrive at the client 350 simultaneously with Frame N+2. As a result, the video stream displayed at the client 350 can freeze, Frame N and Frame N+1 can become useless, and the user can lose the opportunity to take action responsive to Frame N and Frame N+1. The video stream displayed at the client 350 can skip Frame N and Frame N+1 and continue with Frame N+2 after waiting for arrival of Frame N+2.

Figure 5:
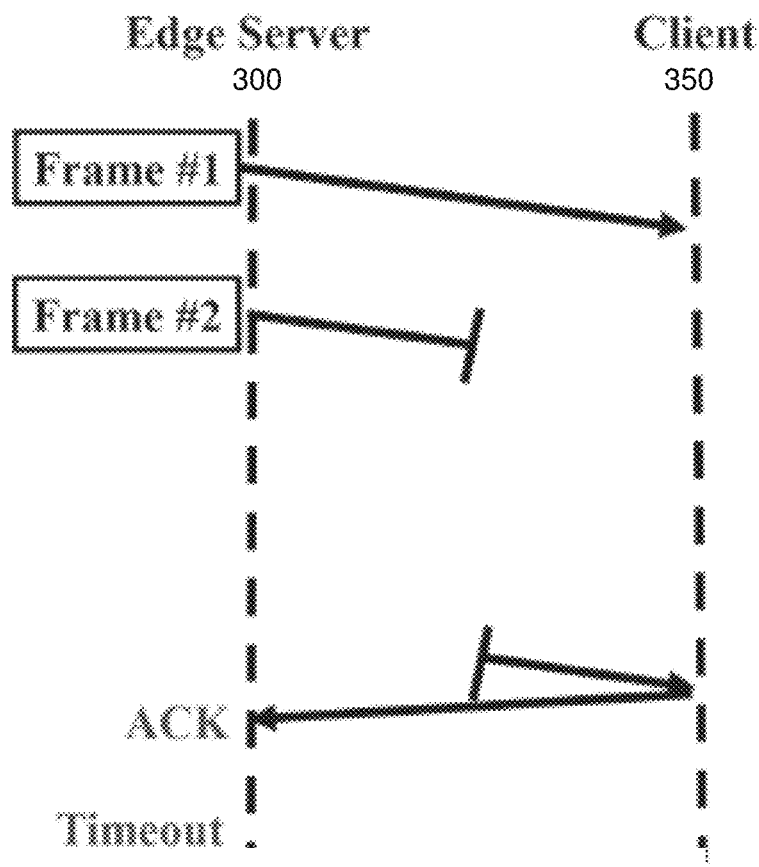
FIG. 5 illustrates operations of an example baseline transport protocol which does not include the improvements disclosed herein, in accordance with various aspects and embodiments of the subject disclosure.

FIG. 5 illustrates operations of an example baseline transport protocol which does not include the improvements disclosed herein, in accordance with various aspects and embodiments of the subject disclosure. The baseline transport protocol can comprise, e.g., TCP or QUIC. Embodiments of this disclosure can optionally include some or all of the features of TCP, QUIC or other prior developed transport protocols, as will be appreciated, while further including the various additional features disclosed herein.

FIG. 5 illustrates the edge server 300 sending a Frame #1, which arrives at the client 350. However, when the edge server 300 sends a Frame #2, the Frame #2 is delayed due to network jitter 220. Using transport protocols such as TCP or QUIC, the client 350 waits until a packet arrives (e.g., the packet comprising Frame #2) before sending an acknowledgement. As a result, the edge server 300 is not made aware of the delay until either the late acknowledgement (ACK) arrives, or until a timeout period expires.

Transport protocols such as TCP and QUIC are not designed to effectively address network jitter. While congestion control mechanisms avoid packet loss caused by congestion, jitter often does not cause any packet loss. Furthermore, detection of jitter through timeout or a late ACK is often too late to take action to mitigate the jitter. Even worse, transport protocols such as TCP and QUIC are designed for high reliability of all transmitted data, and so they will continue re-sending data even after it is useless to the client 350. Such re-sending wastes network bandwidth as well as client 350 processing time in decoding late and therefore useless frames.

While transport protocols such as TCP and QUIC therefore have shortcomings addressed by this disclosure, they also have many useful aspects and features which can be incorporated into embodiments of this disclosure. In some embodiments, transport protocols such as TCP and QUIC can be used for data flagged as high reliability according to this disclosure. Meanwhile, data flagged as reduced reliability (or data which is implicitly reduced reliability by not being flagged as high reliability) can be sent using the transport protocol features described herein.

Figure 6:
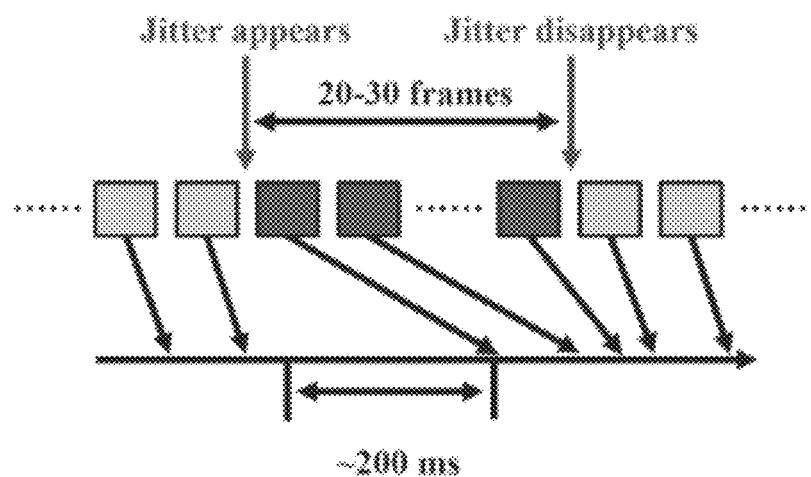
FIG. 6 illustrates an example jitter measurement, in accordance with various aspects and embodiments of the subject disclosure.

FIG. 6 illustrates an example jitter measurement, in accordance with various aspects and embodiments of the subject disclosure. FIG. 6 includes a timeline showing video frames (represented by boxes) sent from a server to a client. In the illustrated example, jitter appears at a first time, and jitter disappears at a later time. The example jitter affects 20-30 frames, and results in an effective latency, as measured at the client, of about 200 ms. Such a jitter is considered significant enough to meaningfully degrade user experience. Embodiments of this disclosure can be used to identify and address jitter such as illustrated in FIG. 6.

Figure 7:
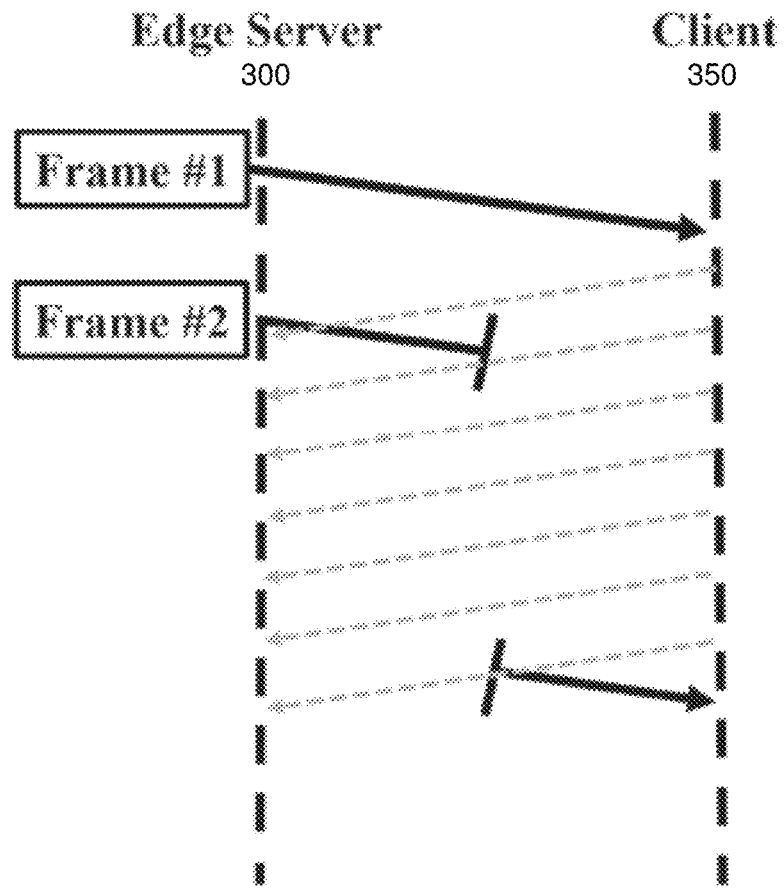
FIG. 7 illustrates network uplink and downlink asymmetry, in accordance with various aspects and embodiments of the subject disclosure.

FIG. 7 illustrates network uplink and downlink asymmetry, in accordance with various aspects and embodiments of the subject disclosure. In FIG. 7, a Frame #1 is delivered normally via a downlink connection from the edge server 300 to the client 350. However, a Frame #2 is affected by jitter in the downlink connection, and as a result, the Frame #2 is delayed. However, multiple successful uplink communications, illustrated by the dashed arrows from the client 350 to the edge server 300, can nonetheless be successful during the period that the downlink communication of Frame #2 is delayed. FIG. 7 illustrates uplink and downlink asymmetry, wherein jitter affecting downlink communications does not necessarily affect uplink communications, and vice versa. Uplink and downlink asymmetry such as illustrated in FIG. 7 is an observation that can enhance the utility of transport protocols according to this disclosure, because downlink jitter can potentially be detected and addressed from information included in successful uplink communications.

Figure 8:
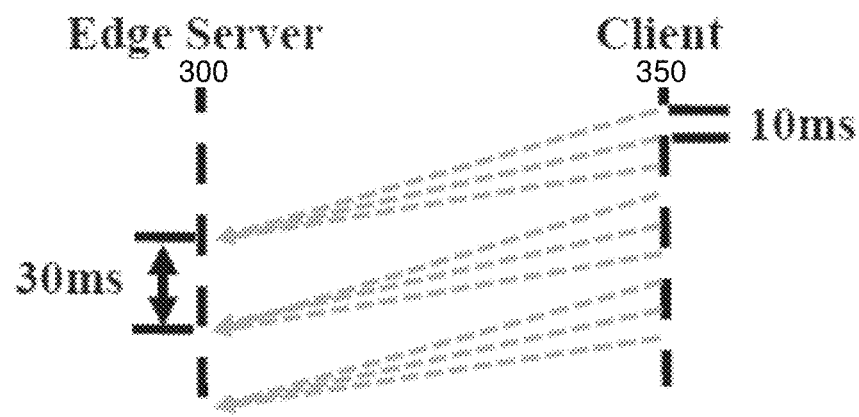
FIG. 8 illustrates an upper bound on uplink sending rate, in accordance with various aspects and embodiments of the subject disclosure.

FIG. 8 illustrates an upper bound on uplink sending rate, in accordance with various aspects and embodiments of the subject disclosure. In the illustrated example, uplink communications are sent from the client 350 to the edge server 300 every 10 ms. However, a network through which the uplink communications travel (such as wireless communication system 100) is able to deliver uplink communications at an uplink sending rate of 30 ms. As a result, the uplink communications sent every 10 ms are delivered to the edge server 300 every 30 ms. In this example, 30 ms can be considered the uplink sending rate upper bound. This measured upper bound can differ in different networks, however, an upper bound can be measured for any network as can be appreciated. The measured upper bound can be used to configure timing of uplink communications, namely, timing of sending acknowledgments, according to this disclosure. Acknowledgements can be sent at or near a time interval equal to the uplink upper bound.

Figure 9:
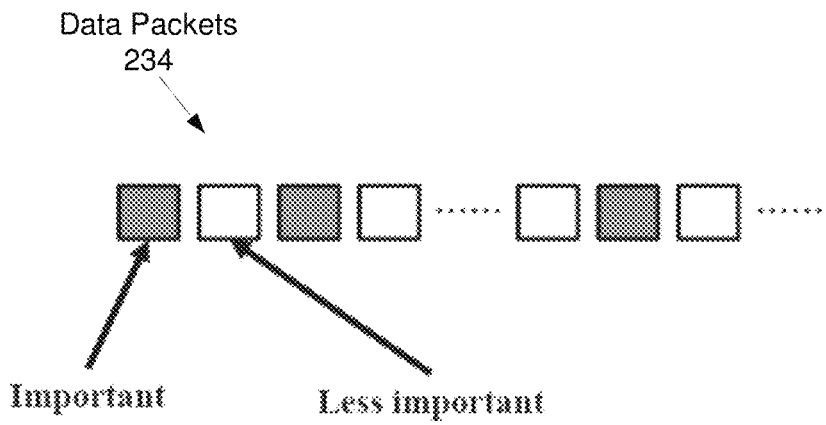
FIG. 9 illustrates demarcation of data as "important" and "less important" so that the data can be sent semi-reliably, in accordance with various aspects and embodiments of the subject disclosure.

FIG. 9 illustrates demarcation of data as "important" and "less important" so that the data can be sent semi-reliably, in accordance with various aspects and embodiments of the subject disclosure. FIG. 9 illustrates a time sequence of data packets 234, e.g., the data packets 234 introduced in FIG. 2. Some of the data packets 234, e.g., the shaded data packets, have been flagged as containing important data which should be sent with high reliability to the client device 240. Others of the data packets 234, e.g., the unshaded data packets, have been left unflagged, or otherwise flagged as less important, and as such can be sent with reduced reliability to the client device 240.

With reference now to FIG. 2, the application 211 can flag data such as video frames 233 as "important" or "less important". The transport layer 212 can then generate data packets 234 comprising video frames 233. Data packets 234 comprising video frames 233 which are flagged as "important" can also be flagged as "important", such as illustrated in FIG. 9. Data packets 234 not comprising video frames 233 which are flagged as "important" can be flagged as "less important", as illustrated in FIG. 9. It will be appreciated that any data can be used to flag a data packet 234 as important or less important.

In some embodiments, data packets 234 flagged as "important" can be sent using a first transport protocol approach, while data packets 234 flagged as "less important" can be sent using a second transport protocol approach. For example, the transport protocol techniques described herein can optionally be used in connection with the "less important" data packets, while other transport protocol techniques, e.g., TCP or QUIC transport protocols, can be used for "important" data packets. In some embodiments, the transport protocol techniques described herein can be used for both "important" and "less important" data packets, and for example, the "important" data packets can be sent with higher reliability while the "less important" data packets can be sent with reduced reliability.

Figure 10:
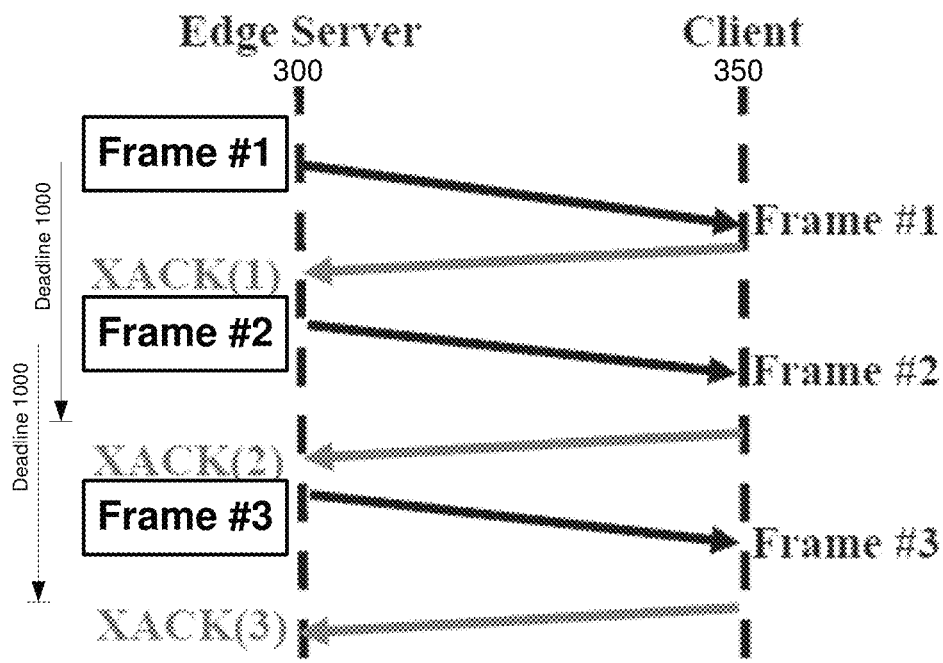
FIG. 10 illustrates operations performed in connection with a transport protocol, in accordance with various aspects and embodiments of the subject disclosure.

FIG. 10 illustrates operations performed in connection with a transport protocol, in accordance with various aspects and embodiments of the subject disclosure. FIG. 10 illustrates the edge server 300 and client 350 introduced in previous figures. Under normal network conditions, without jitter, the edge server 300 can regularly send data such as video frames to the client 350, and the client 350 can regularly send acknowledgements to the edge server 300. For example, the edge server 300 can send to the client 350 a Frame #1, followed by a Frame #2, followed by a Frame #3. The client 350 can receive each of Frame #1, Frame #2, and Frame #3. The client 350 sends periodic acknowledgements, referred to herein as XACKs, to the edge server 300, regardless of whether the client 350 has received any of Frame #1, Frame #2, or Frame #3. Each XACK references data most recently received at the client 350. Thus, in FIG. 10, a first XACK(1) can reference Frame #1. A second XACK(2) can reference Frame #2. A third XACK(3) can reference Frame #3, and so on.

In an example, the edge server 350 can send frames at intervals of about 20-45 ms, e.g., every 33 ms. The client 350 can send XACKs at intervals of about 20-45 ms, e.g., every 33 ms. Because the XACKs reference data most recently received at the client 350, the edge server 300 can optionally use the XACKs for early detection of delays in the delivery of frames to the client 350, as described further in connection with FIG. 11.

FIG. 10 furthermore illustrates a deadline 1000 for data to be sent to the client 350. The deadline 1000 can comprise, e.g., a deadline 232 received from an application 211, such as illustrated in FIG. 2. In the illustrated embodiment, the deadline 1000 can comprise a time limit for resending data, such as Frame #1, to client 350. The deadline 1000 can be established based on the time that data is sent—for example, the deadline 1000 for Frame #1 occurs at a predetermined time after sending Frame #1, the deadline 1000 for Frame #2 occurs at the predetermined time after sending Frame #2, etc. The deadline 1000 can be applied to all data which is sent with reduced reliability. A second, high-reliability deadline can optionally be used for data to be sent with high reliability (not shown in FIG. 10). The high-reliability deadline can be longer than the deadline 1000 for use with reduced reliability data.

In the event that the XACK(2) in FIG. 10 were to reference Frame #1 (instead of Frame #2 as illustrated) then the edge server 300 can re-send Frame #2 to the client 350 so long as the deadline 1000 for Frame #2 is not passed. If the deadline 1000 for Frame #2 is passed, then the edge server 300 can be configured to avoid re-sending Frame #2, because the Frame #2 is likely useless to the client 350 if delayed longer than the deadline 1000.

Figure 11:
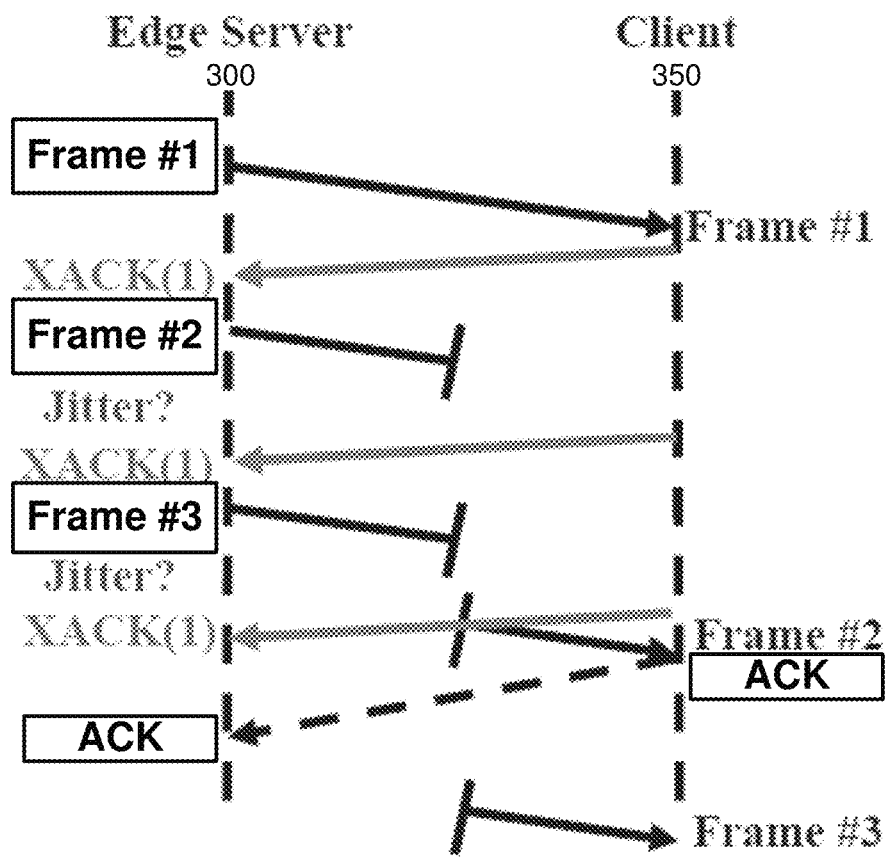
FIG. 11 illustrates early detection network abnormalities by a server, in accordance with various aspects and embodiments of the subject disclosure.

FIG. 11 illustrates early detection network abnormalities by a server, in accordance with various aspects and embodiments of the subject disclosure. In FIG. 11, the edge server 300 regularly sends data such as video frames to the client 350, and the client 350 can regularly send acknowledgements to the edge server 300, as illustrated in FIG. 10. However, Frame #2 and Frame #3 are delayed. Thus, the second XACK sent from the client 350 to the edge server 300 again references Frame #1, the most recently received frame. The third XACK sent from the client 350 to the edge server 300 also again references Frame #1, the most recently received frame. The edge server 300 has the opportunity to detect jitter early, upon receipt of the second and third XACKs received from the client 350. The edge server 300 can take a variety of actions in response to such early jitter detections, including notifying the application 211 and making adjustments in the wireless communication system 100 used to for communication between the edge server 300 and the client 350.

FIG. 11 also illustrates, for comparison, an ACK (which is not an XACK) sent from the client 350 to the edge server 300 to acknowledge receipt of Frame #2 at the client 350. The ACK can be, e.g., a TCP or QUIC protocol ACK. As can be appreciated, if the late arrival of the ACK is used by the edge server 300 for jitter detection, then the edge server 300 detects the jitter later than it would otherwise detect the jitter using the information in the illustrated XACKs.

Figure 12:
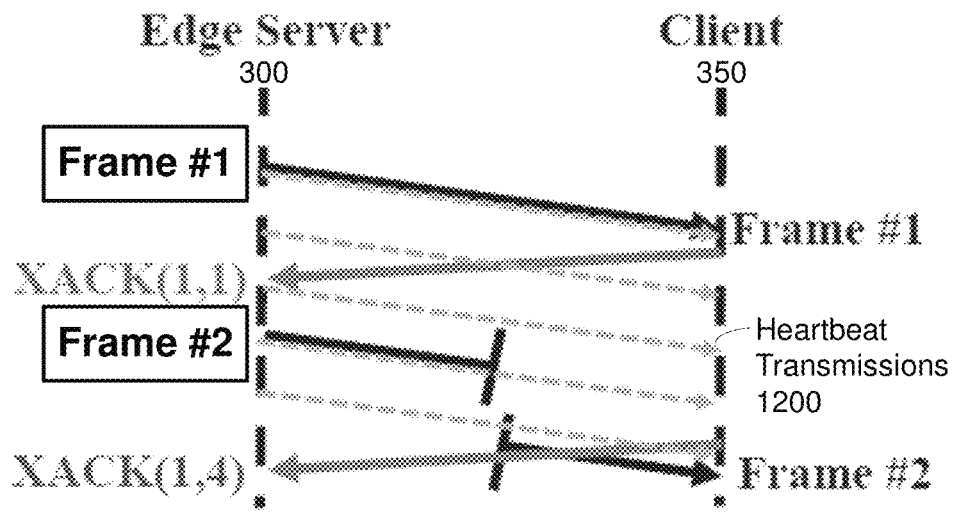
FIG. 12 illustrates heartbeat transmissions, in accordance with various aspects and embodiments of the subject disclosure.

FIG. 12 illustrates heartbeat transmissions, in accordance with various aspects and embodiments of the subject disclosure. In an embodiment, the edge server 300 can send heartbeat transmissions 1200 to the client 350, at regular intervals, in addition to sending data such as Frame #1 and Frame #2. The intervals for sending heartbeat transmissions 1200 can be shorter than the intervals for sending data packets, as shown. For example, intervals for sending heartbeat transmissions 1200 can be between 7-15 ms, e.g., 11 ms, while the intervals for sending data packets can be about 33 ms as described herein.

The client 350 can include, in its XACKs, counts of received heartbeat transmissions in addition to identifications of most recently received data. Thus, in FIG. 12, a first XACK can be XACK(1,1), which acknowledges a most recently received Frame #1, as well as a single heartbeat transmission received since client's 350 previous XACK. A second XACK can be XACK(1,4), which acknowledges a most recently received Frame #1 (in this example, Frame #2 arrives after the second XACK is sent), as well as four heartbeat transmissions received since client's 350 previous XACK. Heartbeat transmissions can be usefully employed for better jitter detection in transport protocols according to this disclosure, as will be understood further from FIG. 13.

Figure 13:
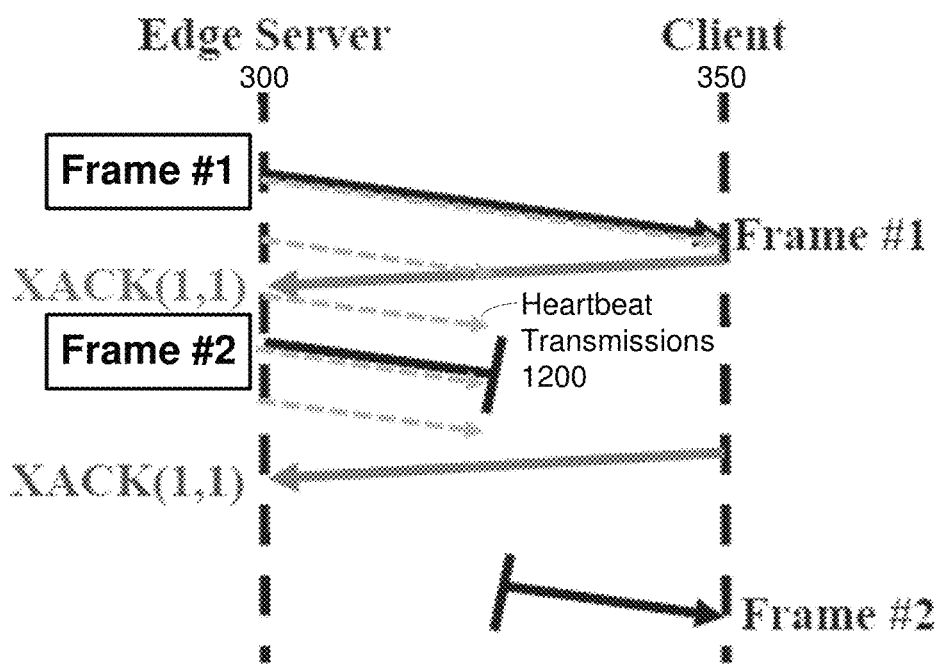
FIG. 13 illustrates heartbeat transmissions affected by jitter, in accordance with various aspects and embodiments of the subject disclosure.

FIG. 13 illustrates heartbeat transmissions affected by jitter, in accordance with various aspects and embodiments of the subject disclosure. In FIG. 13, the heartbeat transmissions 1200 are affected by jitter and either delayed or lost prior to arriving at the client 350. As a result, the second XACK sent by the client 350 can be a second XACK(1,1) which acknowledges a most recently received Frame #1, as well as a number of heartbeat transmissions 1200 (e.g., one heartbeat) received since client's 350 previous XACK. Notably, in this example the number of heartbeat transmissions 1200 received at the client 350 is fewer than the number of heartbeat transmissions 1200 sent by the edge server 300.

The edge server 300 can use heartbeat transmission information included in XACKs to detect the duration and severity of the jitter which also affected delivery of Frame #2. In a scenario such as illustrated in FIG. 12, the jitter which affected Frame #2 can be disregarded by the edge server 300 as not significant, because the jitter did not also affect heartbeat transmissions 1200. Conversely, in a scenario such as illustrated in FIG. 13, the jitter which affected Frame #2 can be treated by the edge server 300 as significant, because the jitter also affected heartbeat transmissions 1200.

Figure 14:
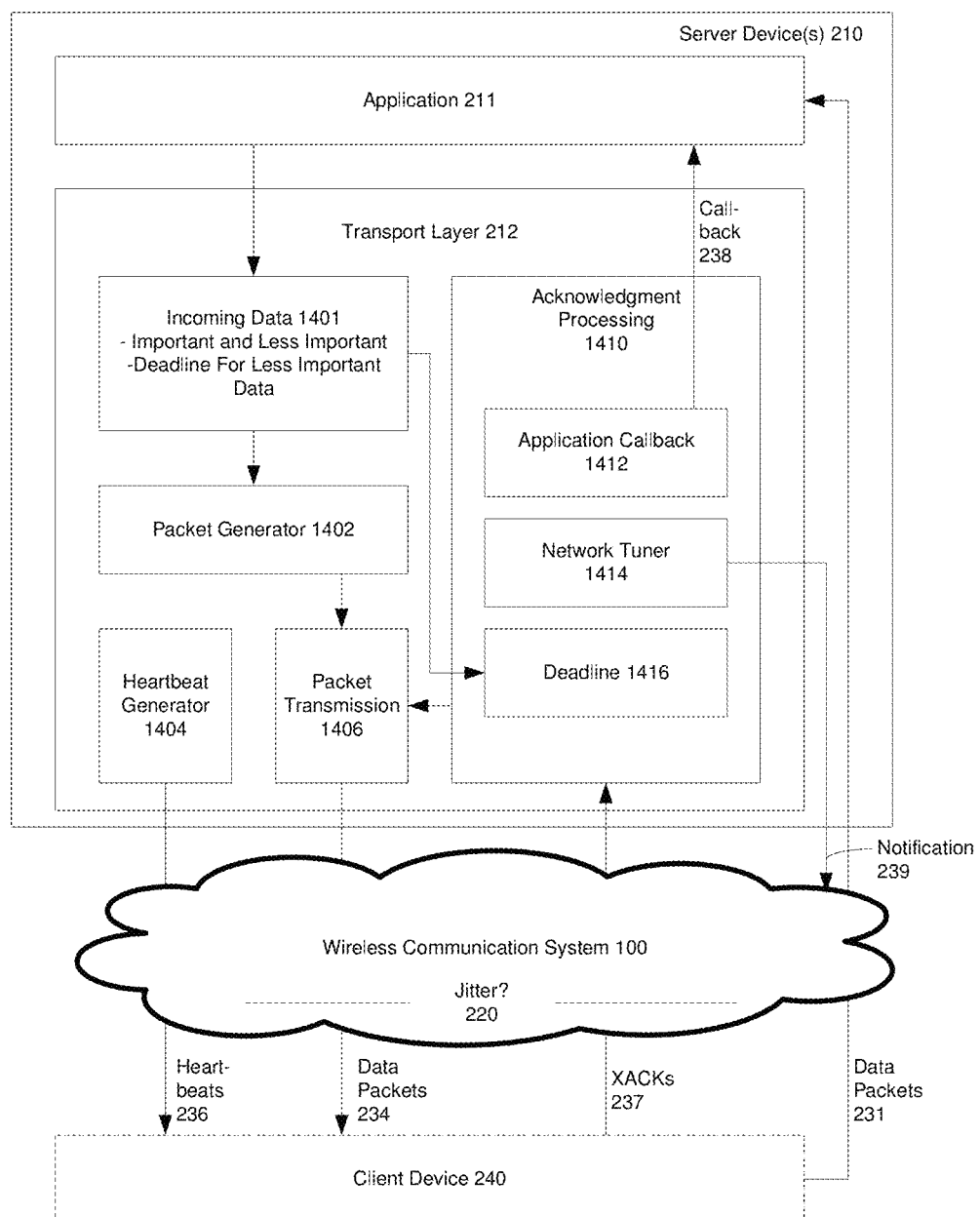
FIG. 14 illustrates example server device(s) configured to use the transport protocol disclosed herein, in accordance with various aspects and embodiments of the subject disclosure.

FIG. 14 illustrates example server device(s) configured to use the transport protocol disclosed herein, in accordance with various aspects and embodiments of the subject disclosure. FIG. 14 includes example server device(s) 210, a wireless communication system 100 and client device 240, all described in connection with FIG. 2. The example server device(s) 210 can include an application 211 and a transport layer 212. The application 211 can generate data, such as video frames, for delivery to the client device 240, and the transport layer 212 can place the data in packets and send the packets to the client device 240, using the transport protocol described herein.

The example transport layer 212 includes incoming data 1401, packet generator 1402, heartbeat generator 1404, packet transmission 1406, and acknowledgement processing 1410. Acknowledgement processing 1410 includes application callback 1412, network tuner 1414, and deadline 1416.

In an example operation of the transport layer 212, incoming data 1401 can be received from the application 211. The incoming data 1410 can include data flagged as important, e.g., data to be sent with high reliability, and data flagged as less important, to be sent with reduced reliability. A deadline 1416 for the less important data can also be received from the application 211. In some embodiments, the deadline 1416 can be included with incoming data 1410.

In other embodiments, the transport layer 212 can be configured with a default deadline 1416 for use with less important data.

Packet generator 1402 can be configured to packetize the incoming data 1401. Data packets containing important data can optionally be flagged as high or standard reliability, and data packets containing less important data can optionally be flagged as low reliability. Packet transmission 1406 can be configured to transmit data packets 234 produced by the packet generator 1402. Packet transmission 1406 can send data packets 234 to the client device 240 via the wireless communication system 100. Packet transmission 1406 can optionally send the data packets 234 at regular intervals, e.g., every 33 ms. Meanwhile, heartbeat generator 1404 can also send heartbeats 236 to the client device 240 via the wireless communication system 100. The heartbeats 236 can be sent at shorter intervals than the data packets 234, for example, the heartbeats 236 can be sent every 11 ms.

Acknowledgment processing 1410 can be configured to receive and process XACKs 237. Under normal network conditions, in the absence of jitter 220 or other network delays, acknowledgment processing 1410 can receive XACKs 237 at a same regular interval as that which the XACKs 237 are sent from client device 240, e.g., every 33 ms. The acknowledgment processing 1410 can confirm that each XACK acknowledges receipt of a next data packet in the series of data packets 234 sent by packet transmission 1406, as well as acknowledging receipt of an expected number of heartbeats 236.

Under aberrant network conditions, such as when jitter 220 delays delivery of data packets 234 and/or heartbeats 236 to the client device 240, acknowledgment processing 1410 can detect multiple XACKs 237 which acknowledge either a same data packet of data packets 234, or otherwise, an unexpected data packet of data packets 234. Acknowledgment processing 1410 can be configured to take a variety of actions under such circumstances. For example, acknowledgment processing 1410 can check whether the apparent delay due to jitter 220 in wireless communication system 100 is significant. This can be accomplished by checking a number of heartbeats 236 acknowledged in the XACKs 237. When the received XACKs 237 indicate the expected number of heartbeats 236, then acknowledgment processing 1410 can infer that any jitter 220 is not significant and further action is not required. However, if received XACKs 237 indicate fewer than the expected number of heartbeats 236, then acknowledgment processing 1410 can take action to address the jitter 220.

Acknowledgment processing 1410 can take any of several actions to address detection of delayed or lost data packets 234 due to significant jitter 220. For data packets 234 carrying reduced reliability (less important) data, acknowledgment processing 1410 can check the deadline 1416 for the reduced reliability data. If the deadline 1416 is not yet passed, then acknowledgment processing 1410 can cause packet transmission 1406 to re-send the reduced reliability data. Otherwise, if the deadline 1416 is passed, then acknowledgment processing 1410 can take no action regarding the delayed reduced reliability data, thereby effectively allowing the delayed reduced reliability data to drop. For data packets 234 carrying high reliability (important) data, acknowledgment processing 1410 can cause packet transmission 1406 to re-send the high reliability data, regardless of deadline 1416.

Furthermore, regardless of whether delayed data packets 234 carried reduced reliability data or high reliability data, in response to detecting significant jitter 220, acknowledgment processing 1410 can activate network tuner 1414 to send notification 239 to a device within wireless communication network 100. Notification 239 can include jitter 220 measurements and/or instructions for different handling of communications between server device(s) 210 and client device 240. In another optional response to detecting significant jitter 220, acknowledgment processing 1410 can activate application callback 1412 to send a callback 238 to application 211, in order to inform application 211 of the jitter 220 and/or the delay in delivering data packets 234 to the client device 240.

Figure 15:
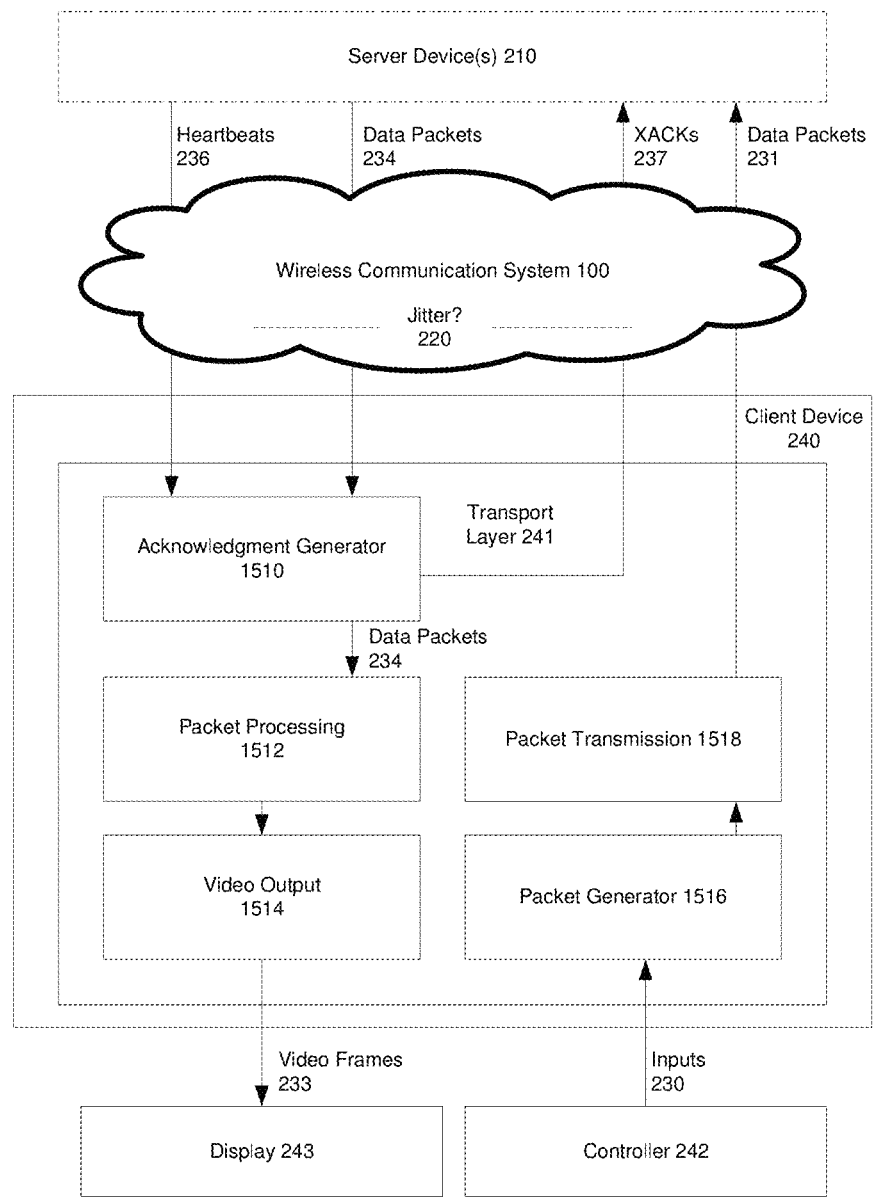
FIG. 15 illustrates an example client device configured to use the transport protocol disclosed herein, in accordance with various aspects and embodiments of the subject disclosure.

FIG. 15 illustrates an example client device configured to use the transport protocol disclosed herein, in accordance with various aspects and embodiments of the subject disclosure. FIG. 14 includes example client device 240, wireless communication system 100 and server device(s) 210, all described in connection with FIG. 2.

The example client device 240 can include a transport layer 241. The transport layer 241 can receive data packets 234 and heartbeats 236, process the data packets 234 to produce a video output 1514 comprising video frames 233 for display 243, and generate and send acknowledgments in the form of XACKs 237 to the server device(s) 210. The transport layer 241 can also receive inputs 230 from controller 242 and send data packets 231 comprising inputs 230 to the server device(s) 210.

In one aspect, acknowledgment generator 1510 can generate and send XACKs 237 to server device(s) 210 at regular intervals, regardless of whether new data packets 234 and heartbeats 236 are received at the client device 240. An example time interval can comprise, e.g., 33 ms as described herein, or otherwise, a measured upper bound for uplink communication timing as descried herein. In an example embodiment, each respective XACK of XACKs 237 can identify a most recently received data packet of data packets 234 (or, for example, a most recently received video frame), as well as a number of heartbeats 236 received at client device 240 since sending a previous respective XACK of XACKs 237. In some embodiments, acknowledgment generator 1510 can also send other acknowledgements, in addition to XACKs 237. For example, acknowledgment generator 1510 can optionally also send acknowledgements according to TCP, QUIC, or other transport protocols.

In another aspect, packet processing 1512 can process received data packets 234 by extracting the video frames 233 therefrom and sequencing the video frames 233 to produce video output 1514 for display 243. Furthermore, packet generator 1516 can receive inputs 230 from the controller 242 and generate data packets 231 comprising the inputs 230. Packet transmission 1518 can transmit data packets 231 to server device(s) 210 via wireless communication system 100.

Figure 16:
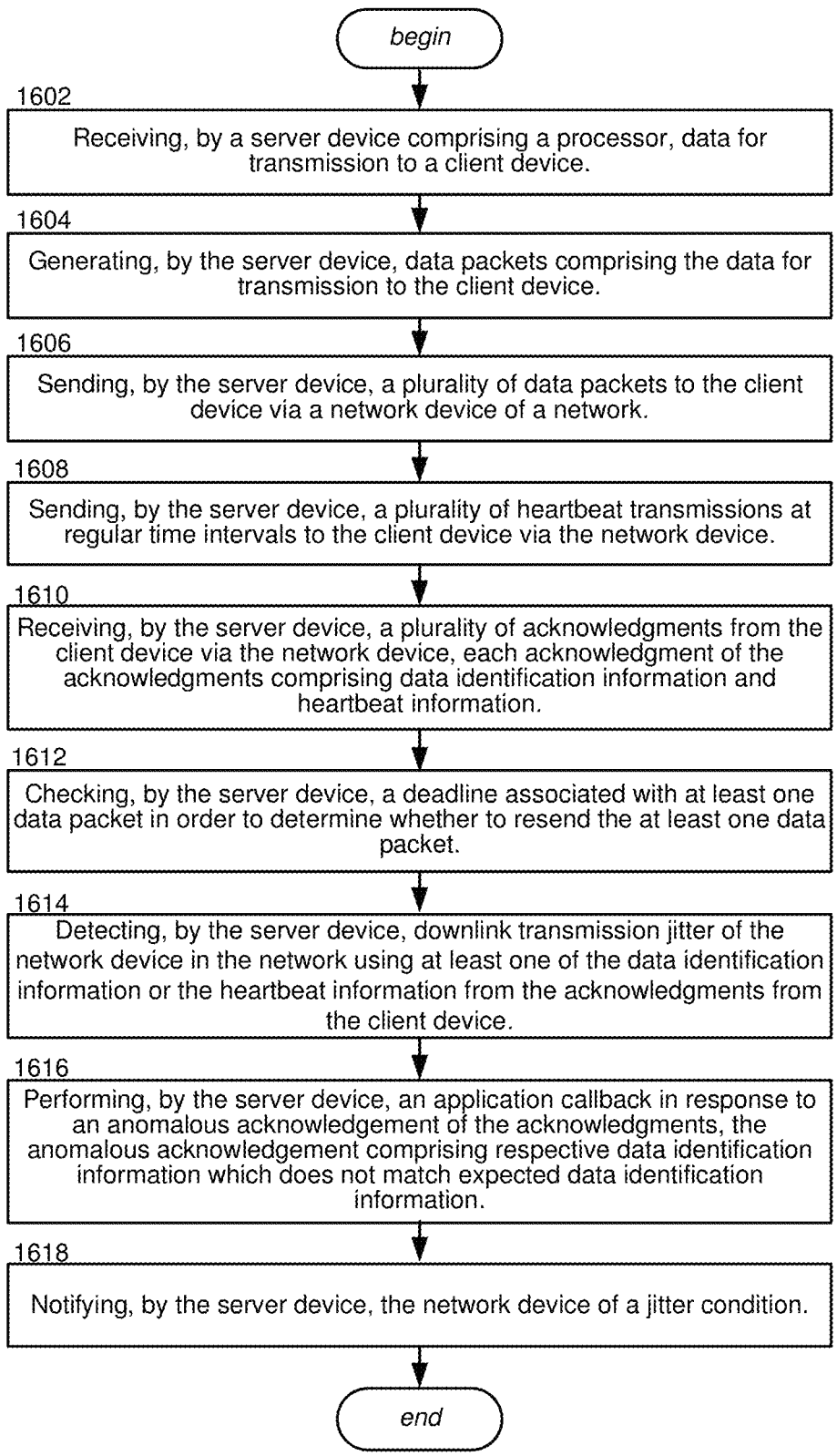
FIG. 16 is a flow diagram representing example operations of a server device, in accordance with various aspects and embodiments of the subject disclosure.

FIG. 16 is a flow diagram representing example operations of a server device, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 16 can be performed, for example, by a server device of server device(s) 210 illustrated in FIG. 2. Example operations comprise operation 1602, which represents receiving, by a server device comprising a processor, data for transmission to a client device. For example, server device(s) 210 can receive data, such as a stream of video frames, from an application 211, e.g., a cloud based video game application, for transmission to a client device 240. Alternatively, when application 211 executes locally at a server device, the server device can generate data for transmission to the client device 240. The data generated or received at server device(s) 210 can optionally include important or high reliability data, also referred to herein as standard reliability data, as well as less important or reduced reliability data.

At 1604, the server device(s) 210 can generate data packets comprising the data for transmission to the client device. For example, the server device(s) 210 can generate a stream of data packets 234 for transmission via wireless communication system 100 to the client device 240. The data packets 234 can comprise, for example, video frames for streaming video for replay at the client device 240. The data packets 234 can optionally include designated high reliability data packets for the high reliability data, and designated reduced reliability data packets for the reduced reliability data.

At 1606, the server device(s) 210 can send a plurality of data packets 234 to the client device 240 via a network device of a network, e.g., via wireless communication system 100. As described in connection with FIG. 1, the wireless communication system 100 can be a cellular communications system and as such the network device can be a cellular network device. In an implementation, the server device(s) 210 can send data packets 234 at regular time intervals, e.g., 33 ms time intervals, or in the range of 25-40 ms time intervals. In an embodiment, the regular time intervals can be uniform, i.e., identical in duration.

At 1608, the server device(s) 210 can send a plurality of heartbeat transmissions 236 at regular time intervals to the client device 240 via the network device of wireless communication system 100. In an implementation, the regular time intervals for sending heartbeat transmissions can comprise, e.g., 5-15 millisecond time intervals. In an embodiment, the regular time intervals can be uniform, i.e., identical in duration.

At 1610, the server device(s) 210 can receive a plurality of acknowledgments 237 from the client device 240 via the network device of wireless communication system 100. Each respective acknowledgment of the acknowledgments 237 can comprise data identification information and heartbeat information. The data identification information can identify data associated with a data packet (of data packets 234) that was respectively most recently received at the client device 240. For example, the data identification information can identify a data packet of data packets 234, or it can identify, e.g., the data within a data packet, such as video frame identification information.

The heartbeat information can indicate a number of heartbeat transmissions 236 received at the client device 240 since the client device 240 sent a previous acknowledgement of acknowledgements 237, before the acknowledgment.

At 1612, the server device(s) 210 can check a deadline associated with at least one data packet in order to determine whether to resend the at least one data packet. For example, should an acknowledgment of the acknowledgments 237 received at 1610 from the client device 240 indicate that at least one data packet of data packets 234 was not received at the client device 240, the server device(s) 210 can check the deadline 1000, illustrated in FIG. 10, associated with the at least one data packet. The server device(s) 210 can resend the at least one data packet to the client device 240 in response to the deadline 1000 being determined to be at a future time, or otherwise the server device(s) 210 can deliberately not resend the at least one data packet to the client device 240 in response to the deadline 1000 being determined to be at a past time.

At 1614, the server device(s) 210 can detect downlink transmission jitter of the network device in the wireless communication system 100 using at least one of the data identification information or the heartbeat information from the acknowledgments from the client device 240. For example, jitter can be detected when data identification information in a received acknowledgement 237 identifies most recently received data at client device 240 which is other than expected. When an acknowledgment 237 identifies "old" data, that is, data which is older than a multiple of expected transmission time via the wireless communication system 100, then jitter is possible. The server device(s) 210 can check heartbeat information in the acknowledgment 237 that identifies the "old" data, to determine if a correct number of heartbeats were counted at the client device 240. If the number of counted heartbeats is lower than expected (lower than a number of heartbeats transmitted by the server device(s) 210), then the server device(s) 210 can infer jitter and take responsive actions.

At 1616, the server device(s) 210 can perform an application callback in response to an anomalous acknowledgement of the acknowledgments 237, the anomalous acknowledgement comprising respective data identification information which does not match expected data identification information. For example, when jitter is detected at 1612, due to the anomalous acknowledgement 237 comprising "old" data identification information, then one of the responsive actions by server device(s) 210 can comprise an application callback to notify the application 211 of the jitter condition which may be affecting user experience and game play.

At 1618, the server device(s) 210 can notify the wireless communication system 100, or any device associated with the wireless communication system 100, of the detected jitter condition, detected at block 1614.

Figure 17:
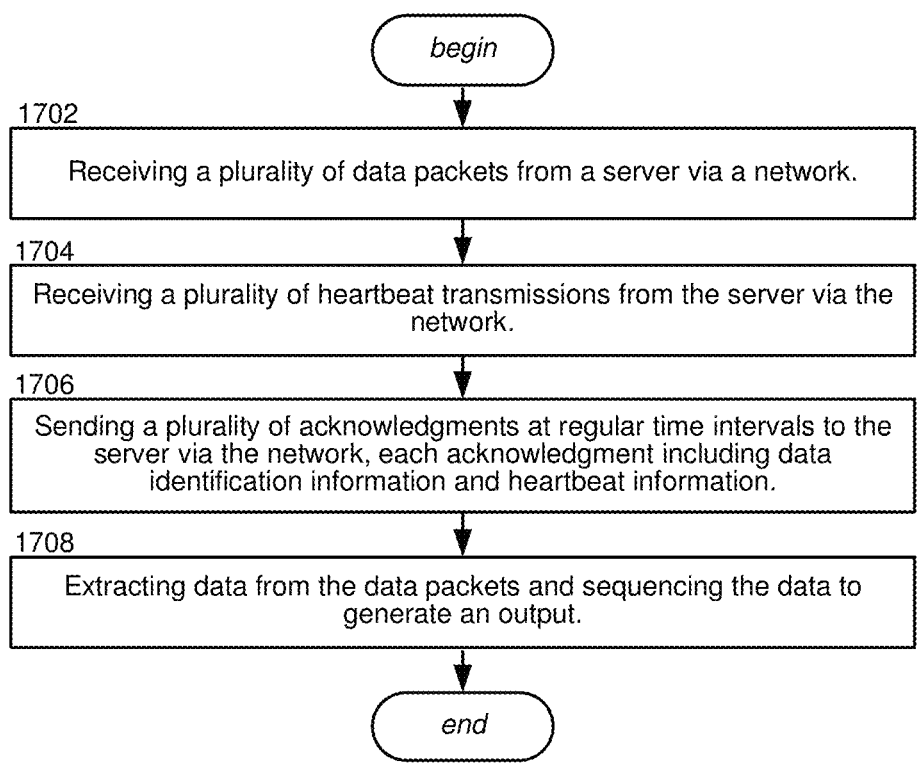
FIG. 17 is a flow diagram representing example operations of a client device, in accordance with various aspects and embodiments of the subject disclosure.

FIG. 17 is a flow diagram representing example operations of a client device, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 17 can be performed, for example, by a client device 240 illustrated in FIG. 2. Example operations comprise operation 1702, which represents receiving a plurality of data packets 234 from a server 210 via a network, such as wireless communication system 100. The data packets 234 can comprise a stream of packets including video frames for streaming video rendered in connection with a video game. At 1704, client device 240 can receive a plurality of heartbeat transmissions 236 from the server 210 via the network 100.

At 1706, client device 240 can send a plurality of acknowledgments 237, sequenced at regular time intervals, to the server 210 via the network 100. In an implementation, the regular time intervals for sending acknowledgments 237 can comprise, e.g., 25-45 millisecond time intervals as described herein. In an embodiment, the regular time intervals can be uniform, i.e., identical in duration. Each respective acknowledgment of acknowledgements 237 can include data identification information and heartbeat information. The data identification information can identify data associated with a data packet of data packets 234 that was most recently received at the client device 240. For example, when the data packets 234 comprise video frames for streaming video for replay at the client device 240, the data identification information can comprise most recently received video frame identification information.

The heartbeat information can indicate a number of heartbeat transmissions 236 received at the client device 240 since the client device 240 since the client device 240 last sent an acknowledgement to the server 210. It will be appreciated that a wide variety of approaches can be used to track heartbeat transmissions 236. In some embodiments, heartbeat transmissions 236 can have heartbeat identifiers. In other embodiments, a running total number of heartbeat transmissions 236 can be counted. In an implementation, the heartbeat transmissions 236 can be received from the server 210 every 5-15 milliseconds, unless of course the heartbeat transmissions 236 are delayed by jitter or other adverse network conditions.

At 1708, client device 240 can extracting data from the data packets 234 and sequencing the data, e.g., the video frames 233, to generate an output, such as the video output 1514 illustrated in FIG. 15.

Figure 18:
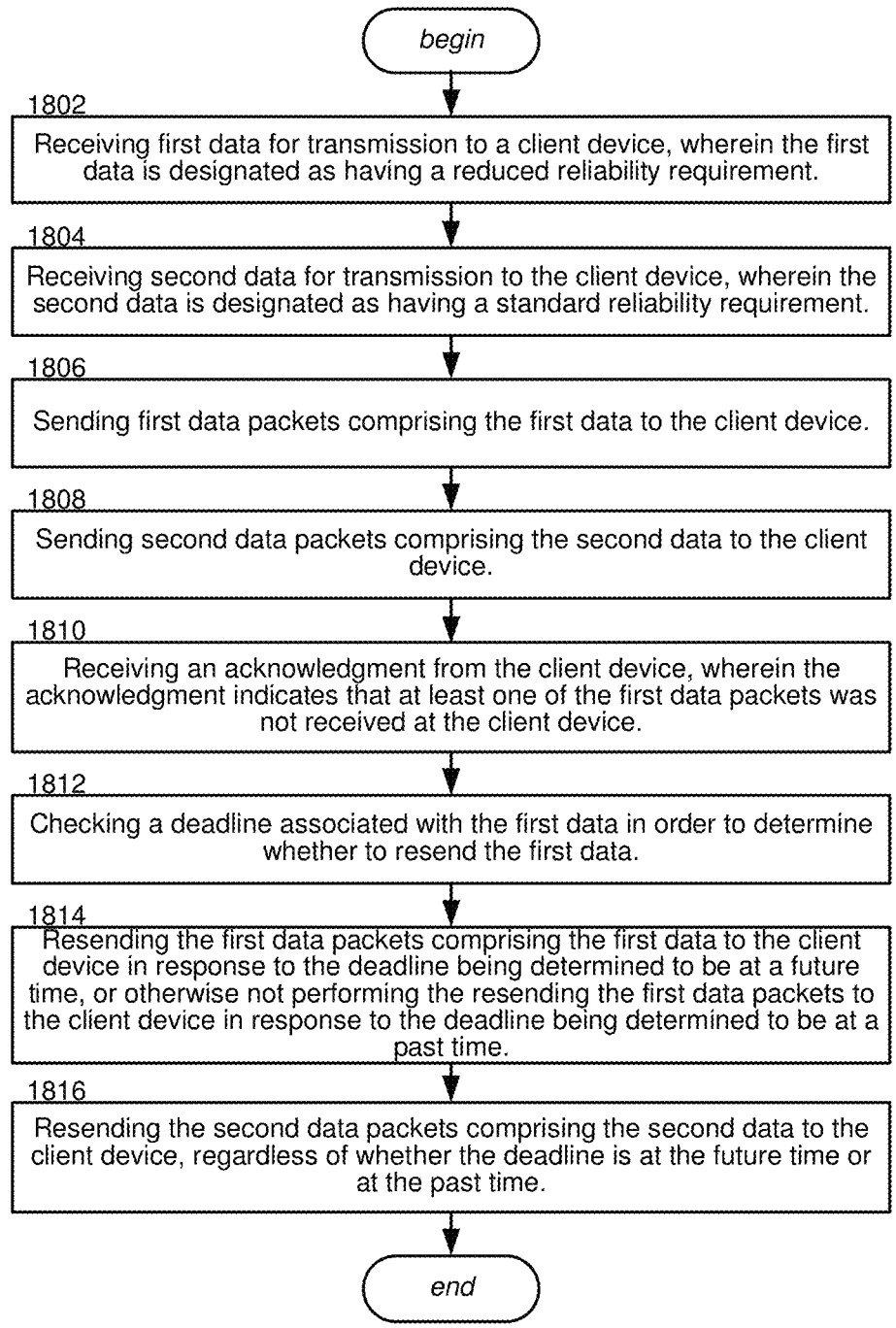
FIG. 18 is a flow diagram representing additional example operations of a server device, in accordance with various aspects and embodiments of the subject disclosure.

FIG. 18 is a flow diagram representing additional example operations of a server device, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 18 can be performed, for example, by a server device of server device(s) 210 illustrated in FIG. 2. Example operations comprise operation 1802, which represents receiving first data, such as some of the video frames 233, for transmission to a client device 240, wherein the first data is designated as having a reduced reliability requirement. The first data can comprise, e.g., video frame data for a streaming video game. At 1804, the server device(s) 210 can receive second data, such as others of the video frames 233, for transmission to the client device 240, wherein the second data is designated as having a standard reliability requirement. The second data for transmission to the client device can comprise, e.g., iframe data for a video game or other data which either is less time sensitive or more important for game play.

At 1806, the server device(s) 210 can send first data packets (of data packets 234) comprising the first data to the client device 240. At 1808, the server device(s) 210 can send second data packets (of data packets 234) comprising the second data to the client device 240. Although not included in FIG. 18, in an embodiment, the server device(s) 210 can furthermore send heartbeats 236 to the client device 240.

At 1810, the server device(s) 210 can receive an acknowledgment (of acknowledgements 237) from the client device 240, wherein the acknowledgment indicates that at least one of the first data packets was not received at the client device 240. The indication can comprise, e.g., identification of a previously sent "old" data packet as the most recently received by client device 240. The server device(s) 210 can compare a data packet identified in an acknowledgement to at least one of the first data packets sent from the server device(s) 210, and thereby identify whether the identified data packet is indicative of data packets have not been received at the client device 240.

At 1812, the server device(s) 210 can check a deadline associated with the first data, such as deadline 1416 illustrated in FIG. 14, in order to determine whether to resend the first data. At 1814, the server device(s) 210 can resend the first data packets comprising the first data to the client device 240 in response to the deadline 1416 being determined to be at a future time, or otherwise the server device(s) 210 can deliberately not perform the resending the first data packets to the client device 240 in response to the deadline 1416 being determined to be at a past time.

At 1816, the server device(s) 210 can resend the second data packets comprising the second data to the client device 240, regardless of whether the deadline 1416 is at the future time or at the past time. In this regard, the standard reliability data can be resent according to a more reliable delivery approach, while the reduced reliability data can be discarded when it is no longer useful.

Figure 19:
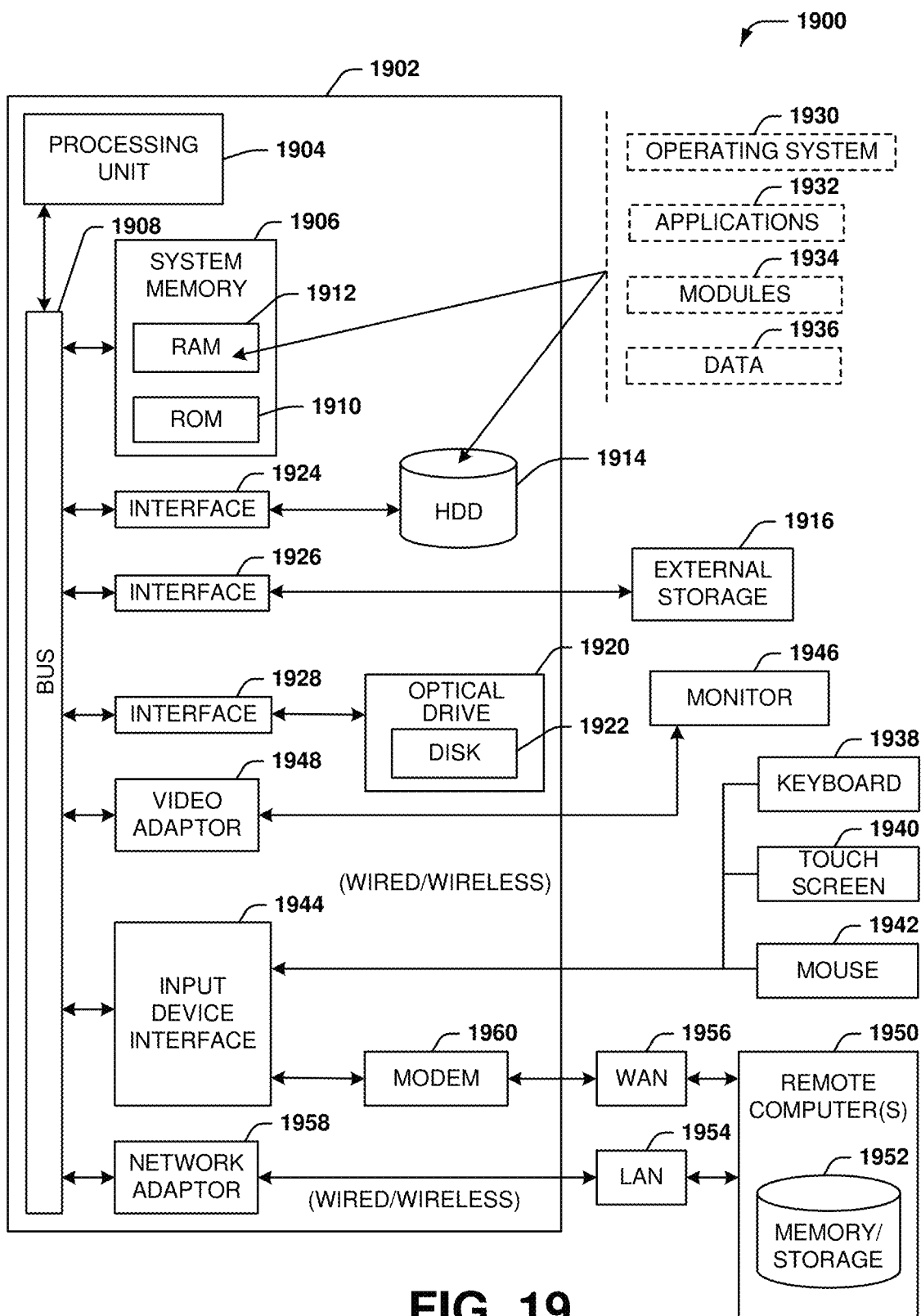
FIG. 19 is a block diagram of an example computer that can be operable to execute processes and methods in accordance with various aspects and embodiments of the subject disclosure.

FIG. 19 is a block diagram of an example computer that can be operable to execute processes and methods in accordance with various aspects and embodiments of the subject disclosure. The example computer can be adapted to implement, for example, a server, a UE, network device, or a client device, as described herein.

FIG. 19 and the following discussion are intended to provide a brief, general description of a suitable computing environment 1900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 19, the example environment 1900 for implementing various embodiments of the aspects described herein includes a computer 1902, the computer 1902 including a processing unit 1904, a system memory 1906 and a system bus 1908. The system bus 1908 couples system components including, but not limited to, the system memory 1906 to the processing unit 1904. The processing unit 1904 can be any of various commercially available processors. Dual microprocessors and other multi-processor architectures can also be employed as the processing unit 1904.

The system bus 1908 can be any of several types of bus structure that can further interconnect to a memory bus (with or without a memory controller), a peripheral bus, and a local bus using any of a variety of commercially available bus architectures. The system memory 1906 includes ROM 1910 and RAM 1912. A basic input/output system (BIOS) can be stored in a non-volatile memory such as ROM, erasable programmable read only memory (EPROM), EEPROM, which BIOS contains the basic routines that help to transfer information between elements within the computer 1902, such as during startup. The RAM 1912 can also include a high-speed RAM such as static RAM for caching data.

The computer 1902 further includes an internal hard disk drive (HDD) 1914 (e.g., EIDE, SATA), one or more external storage devices 1916 (e.g., a magnetic floppy disk drive (FDD) 1916, a memory stick or flash drive reader, a memory card reader, etc.) and an optical disk drive 1920 (e.g., which can read or write from a CD-ROM disc, a DVD, a BD, etc.). While the internal HDD 1914 is illustrated as located within the computer 1902, the internal HDD 1914 can also be configured for external use in a suitable chassis (not shown). Additionally, while not shown in environment 1900, a solid state drive (SSD) could be used in addition to, or in place of, an HDD 1914. The HDD 1914, external storage device(s) 1916 and optical disk drive 1920 can be connected to the system bus 1908 by an HDD interface 1924, an external storage interface 1926 and an optical drive interface 1928, respectively. The interface 1924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1912, including an operating system 1930, one or more application programs 1932, other program modules 1934 and program data 1936. All or portions of the operating system, applications, modules, and/or data can also be cached in the RAM 1912. The systems and methods described herein can be implemented utilizing various commercially available operating systems or combinations of operating systems.

Computer 1902 can optionally comprise emulation technologies. For example, a hypervisor (not shown) or other intermediary can emulate a hardware environment for operating system 1930, and the emulated hardware can optionally be different from the hardware illustrated in FIG. 19. In such an embodiment, operating system 1930 can comprise one virtual machine (VM) of multiple VMs hosted at computer 1902. Furthermore, operating system 1930 can provide runtime environments, such as the Java runtime environment or the .NET framework, for applications 1932. Runtime environments are consistent execution environments that allow applications 1932 to run on any operating system that includes the runtime environment. Similarly, operating system 1930 can support containers, and applications 1932 can be in the form of containers, which are lightweight, standalone, executable packages of software that include, e.g., code, runtime, system tools, system libraries and settings for an application.

Further, computer 1902 can be enable with a security module, such as a trusted processing module (TPM). For instance, with a TPM, boot components hash next in time boot components, and wait for a match of results to secured values, before loading a next boot component. This process can take place at any layer in the code execution stack of computer 1902, e.g., applied at the application execution level or at the operating system (OS) kernel level, thereby enabling security at any level of code execution.

A user can enter commands and information into the computer 1902 through one or more wired/wireless input devices, e.g., a keyboard 1938, a touch screen 1940, and a pointing device, such as a mouse 1942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1904 through an input device interface 1944 that can be coupled to the system bus 1908, but can be connected by other interfaces, such as a parallel port, an IEEE 1394 serial port, a game port, a USB port, an IR interface, a BLUETOOTH® interface, etc.

A monitor 1946 or other type of display device can be also connected to the system bus 1908 via an interface, such as a video adapter 1948. In addition to the monitor 1946, a computer typically includes other peripheral output devices (not shown), such as speakers, printers, etc.

The computer 1902 can operate in a networked environment using logical connections via wired and/or wireless communications to one or more remote computers, such as a remote computer(s) 1950. The remote computer(s) 1950 can be a workstation, a server computer, a router, a personal computer, portable computer, microprocessor-based entertainment appliance, a peer device or other common network node, and typically includes many or all of the elements described relative to the computer 1902, although, for purposes of brevity, only a memory/storage device 1952 is illustrated. The logical connections depicted include wired/wireless connectivity to a local area network (LAN) 1954 and/or larger networks, e.g., a wide area network (WAN) 1956. Such LAN and WAN networking environments are commonplace in offices and companies, and facilitate enterprise-wide computer networks, such as intranets, all of which can connect to a global communications network, e.g., the internet.

When used in a LAN networking environment, the computer 1902 can be connected to the local network 1954 through a wired and/or wireless communication network interface or adapter 1958. The adapter 1958 can facilitate wired or wireless communication to the LAN 1954, which can also include a wireless access point (AP) disposed thereon for communicating with the adapter 1958 in a wireless mode.

When used in a WAN networking environment, the computer 1902 can include a modem 1960 or can be connected to a communications server on the WAN 1956 via other means for establishing communications over the WAN 1956, such as by way of the internet. The modem 1960, which can be internal or external and a wired or wireless device, can be connected to the system bus 1908 via the input device interface 1944. In a networked environment, program modules depicted relative to the computer 1902 or portions thereof, can be stored in the remote memory/storage device 1952. It will be appreciated that the network connections shown are example and other means of establishing a communications link between the computers can be used.

When used in either a LAN or WAN networking environment, the computer 1902 can access cloud storage systems or other network-based storage systems in addition to, or in place of, external storage devices 1916 as described above. Generally, a connection between the computer 1902 and a cloud storage system can be established over a LAN 1954 or WAN 1956 e.g., by the adapter 1958 or modem 1960, respectively. Upon connecting the computer 1902 to an associated cloud storage system, the external storage interface 1926 can, with the aid of the adapter 1958 and/or modem 1960, manage storage provided by the cloud storage system as it would other types of external storage. For instance, the external storage interface 1926 can be configured to provide access to cloud storage sources as if those sources were physically connected to the computer 1902.

The computer 1902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   sending, by a server comprising a processor, first data packets to a client device;
   sending, by the server, second data packets to the client device;
   sending, by the server, heartbeat transmissions to the client device;
   receiving, by the server, an acknowledgment from the client device, the acknowledgment comprising data identification information and heartbeat information,
   wherein the data identification information identifies data most recently received at the client device, wherein the data most recently received at the client device comprises data of the first data packets or the second data packets, and
   wherein the heartbeat information identifies a number of heartbeat transmissions received at the client device since the client device sent a previous acknowledgement to the server; and
   in response to the acknowledgement, resending, by the server, at least one of the second data packets to the client device, regardless of a deadline associated with resending the first data packets.

2. The method of claim 1, wherein the first data packets and the second data packets comprise video frames, and wherein the data identification information comprises video frame identification information.

3. The method of claim 1, wherein the first data packets and the second data packets comprise video frames for a video game.

4. The method of claim 1, wherein communications between the server and the client device are via a cellular communications network device.

5. The method of claim 1, wherein the heartbeat transmissions are sent at uniform regular time intervals.

6. The method of claim 1, wherein at least one of the first data packets sent to the client device is designated as having a reduced reliability requirement.

7. The method of claim 6, wherein the acknowledgment indicates that at least one first data packet of the first data packets was not received at the client device, and further comprising checking, by the server, the deadline in order to determine whether to resend the at least one first data packet.

8. The method of claim 1, further comprising detecting, by the server, downlink transmission jitter using at least one of the data identification information or the heartbeat information.

9. The method of claim 1, further comprising performing, by the server, an application callback in response to the acknowledgement comprising data identification information that does not match expected data identification information.

10. A client device, comprising:
    a processor; and
    a memory that stores executable instructions that, when executed by the processor, facilitate performance of operations, comprising:
    receiving data packets from a server, wherein the data packets comprise reduced reliability data packets that are subject to a delivery deadline and standard reliability data packets that are not subject to the delivery deadline;
    receiving heartbeat transmissions from the server;
    sending an acknowledgment to the server, wherein the acknowledgment comprises:
      data identification information to identify data most recently received at the client device, wherein the data most recently received at the client device comprises data of the reduced reliability data packets or the standard reliability data packets; and
      heartbeat information to indicate a number of heartbeat transmissions received at the client device since the client device sent a previous acknowledgement to the server; and
    receiving additional data packets from the server in addition to the data packets, wherein the additional data packets comprise at least one of the standard reliability data packets, and wherein the additional data packets do not comprise the reduced reliability data packets.

11. The client device of claim 10, wherein the data packets comprise video frames, and wherein the data identification information comprises video frame identification information.

12. The client device of claim 10, wherein the data packets comprise video frames for a video game.

13. The client device of claim 10, wherein communications between the client device and the server are via a cellular communications network.

14. The client device of claim 10, wherein sending the acknowledgment to the server comprises sending the acknowledgement according to a uniform regular time interval.

15. The client device of claim 10, wherein the heartbeat transmissions are received from the server at regular time intervals.

16. A non-transitory machine-readable medium, comprising executable instructions that, when executed by a processor of a server, facilitate performance of operations, comprising:
    sending first data packets comprising first data to a client device;
    sending second data packets comprising second data to the client device;
    receiving an acknowledgment from the client device, wherein the acknowledgment indicates that at least one data packet of the first data packets and the second data packets was not received at the client device;

in response to the acknowledgement, checking a deadline;
in response to the deadline being determined to be at a past time:
   not resending the at least one data packet when the at least one data packet is among the first data packets; or
   resending the at least one data packet when the at least one data packet is among the second data packets.

17. The non-transitory machine-readable medium of claim 16, wherein the operations further comprise, in response to the deadline being determined to be at a future time:
   resending the at least one data packet when the at least one data packet is among the first data packets; and
   resending the at least one data packet when the at least one data packet is among the second data packets.

18. The non-transitory machine-readable medium of claim 16, wherein the first data packets and the second data packets comprise video frame data.

19. The non-transitory machine-readable medium of claim 16, wherein the operations further comprise sending heartbeat transmissions to the client device, and wherein the acknowledgment comprises heartbeat information to indicate a number of the heartbeat transmissions received at the client device.

20. The non-transitory machine-readable medium of claim 19, wherein the acknowledgment indicates that the at least one data packet of the first data packets and the second data packets was not received at the client device by identifying a data packet that was most recently received at the client device, resulting in an identified data packet, and wherein the operations further comprise comparing the identified data packet to at least one of the first data packets and the second data packets sent to the client device, and comparing the heartbeat information to the heartbeat transmissions sent to the client device.

* * * * *